June 7, 1966　　　　　D. E. BAKER　　　　　3,254,801
DEVICES FOR TRANSFERRING PARTICULATE MATERIAL BETWEEN
ZONES AT DIFFERENT PRESSURES
Filed Dec. 6, 1962　　　　　　　　　　　　2 Sheets-Sheet 1
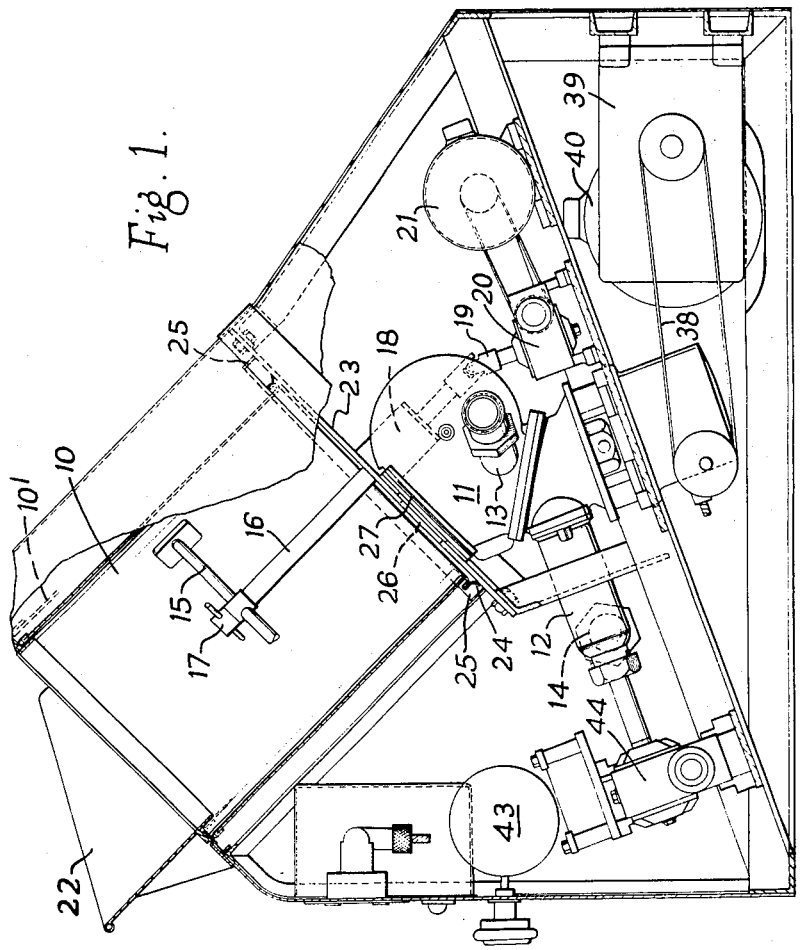
INVENTOR
Donald E. Baker
BY
Kemon, Palmer, Stuart & Estabrook
ATTORNEYS

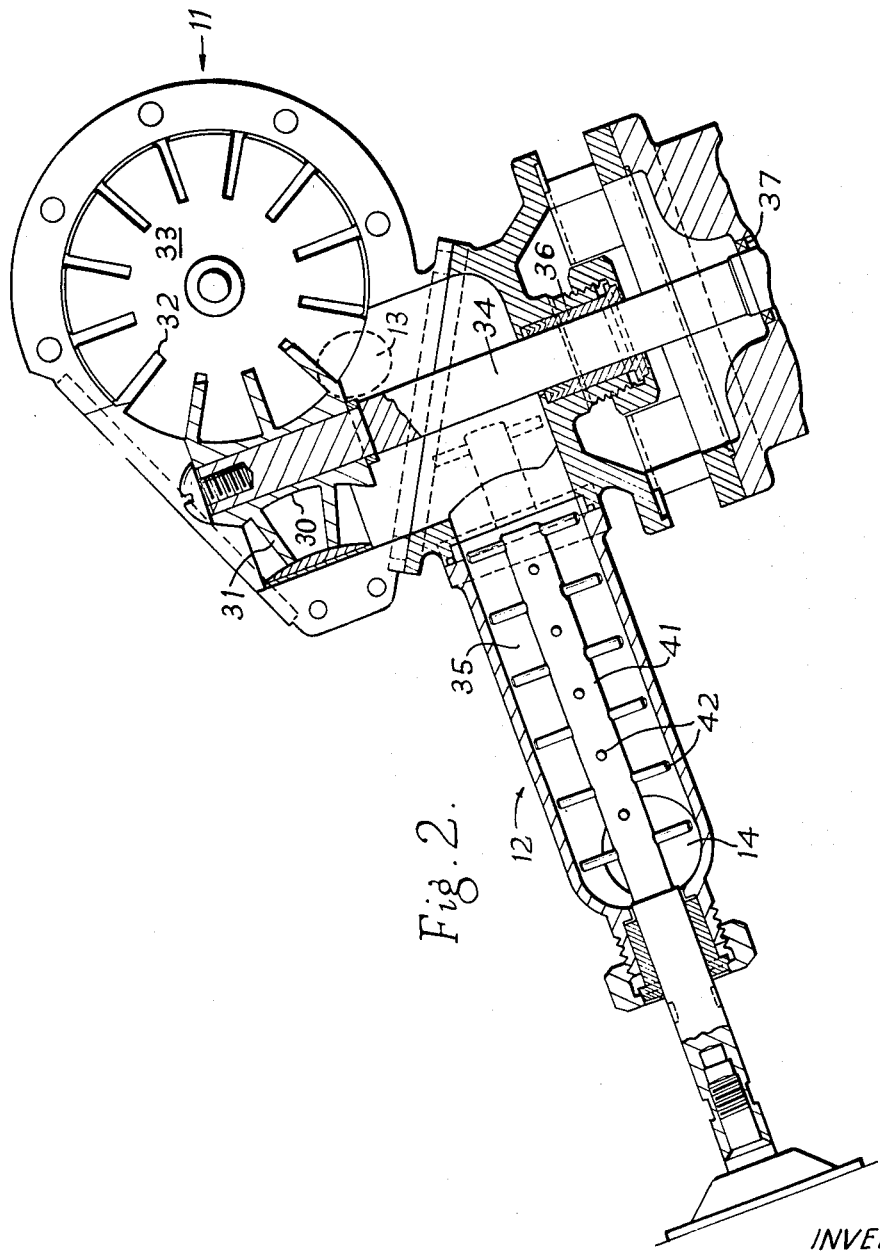

United States Patent Office 3,254,801
Patented June 7, 1966

3,254,801
DEVICES FOR TRANSFERRING PARTICULATE MATERIAL BETWEEN ZONES AT DIFFERENT PRESSURES
Donald Ernest Baker, Macclesfield, England, assignor to E. T. Oakes Corporation, Islip, Long Island, N.Y.
Filed Dec. 6, 1962, Ser. No. 242,708
Claims priority, application Great Britain, Dec. 7, 1961, 43,906/61
20 Claims. (Cl. 222—167)

The present invention relates to the mechanical handling of particulate materials and their introduction into a continuous stream of fluid material. The invention is particularly concerned with the difficulties encountered in introducing fruit such as cherries, sultanas, and currants into a cake mixture or batter which is being delivered in a continuous stream under pressure, but the methods and apparatus of the invention can be used for handling other materials, for example for the mixing of crumb rubber into a continuous stream of foamed latex.

In mixing fruit into a cake batter two principal difficulties have to be overcome. The first is that of handling a mass of particulate material such as fruit which tends to stick together and compact under its own weight and is thus very difficult to transfer from a container in a continuous stream. The second is that of transferring the material continuously at a controlled rate between zones at different pressures, in this case into an enclosure in which the batter is maintained under pressure, without any substantial leakage which would tend to equalize the pressures in the two zones and cause loss of material from the high pressure zone and loss of power.

Broadly, the present invention overcomes the leakage problem by the use of a pump having within a closely fitting casing a rotary gear element which is constantly in mesh with a second rotary element in such a manner as to substantially prevent leakage from the high-pressure to the low-pressure zone, particulate material being transmitted through the pump, while in operation, in a continuous succession of discrete quantities carried in spaces between the working projections of the gear element. By the working projections of a gear element are meant those projections which serve to transmit power between meshing gear elements, for example the teeth of spur gears and the successive turns of the spiral ridge of a worm.

The gear element and the second element may both be spur gears which carry the particulate material in the pockets between their teeth and the wall of the casing, the pump then being similar to the well-known gear pumps used for liquids. In a preferred embodiment the second element is a disc with radial slots in its periphery and the gear element is a form of worm having a helical flange which is disposed at a varying angle to the body of the worm to enable it to run in the slots of the disc, the body of the worm being of concave longitudinal profile complementary to the periphery of the disc so that the parts of the disc between the slots fit the cross-section of the spiral groove of the worm with a very small clearance at each point at which they enter it.

The use of such a pump as a metering device overcomes the leakage difficulty and enables the particulate material to be transmitted at a controlled rate dependent upon the speed at which the gear element is rotated provided that the material can be supplied to the inlet of the metering device at such a rate that this inlet is always "flooded" or filled with material at a rate at least as great as that at which the material is being transmitted by the pump. With sticky agglomerate materials, such as fruit for cakes, which tend to compact under their own weight in a storage container the feeding of the material to the pump presents special difficulties. These difficulties are overcome, in accordance with the invention, by the use of an inclined rotary cylinder or drum in which the fruit or other sticky agglomerate material is held in a state of continual agitation and from an aperture in the lower end of which it flows in a more or less continuous stream into the pump unit forming the pressure-lock. It will be realised that this arrangement for obtaining a continuous flow of particulate materials which tend to stick together from a storage container is of more general application.

Thus the invention provides a method of treating an agglomerate mass of particulate material preparatory to transport or mixing in which the material is placed in a cylindrical container mounted with its axis inclined to the horizontal and having an open lower end covered by a stationary wall having an outlet opening and the cylinder is rotated to agitate the material in such a manner as to prevent compaction thereof, the material being delivered as a continuous stream from the outlet opening.

For carrying out this method there is provided apparatus comprising a cylindrical container mounted with its axis inclined to the horizontal and having an open lower end covered by a stationary wall having an outlet opening adjacent the lower part of the end of the cylinder, and means for rotating the cylinder to agitate material delivered into the upper end of the cylinder.

Preferably the cylinder is mounted eccentrically to its axis of rotation. The angle of inclination of the axis of the cylinder to the horizontal should be at least 30° and preferably in the range of 40°–55° but may be as much as 70°.

The continuous stream of material coming from the outlet opening may be fed to a metering device such as the gear pump described above for controlling the rate of supply of the material into an enclosure and in particular into a mixing chamber through which a stream of liquid or semi-liquid material is passing.

For mixing fruit into a cake batter the invention provides apparatus comprising a cylindrical container mounted with its axis inclined to the horizontal and having an open lower end covered by a stationary wall having an outlet opening, means for rotating the cylindrical container to agitate fruit placed therein in such a manner as to prevent compaction of the fruit, a metering device arranged to receive a continuous stream of fruit from the outlet opening and to admit the fruit at a controlled rate to a mixing chamber while preventing the escape of batter under pressure from the mixing chamber, the mixing chamber having an inlet for batter, a pegged rotary shaft for mixing the batter and fruit, and an outlet for the mixture.

One embodiment of the invention, which will now be described by way of example, includes a metering device in the form of a gear pump in which two intermeshing rotors, which have convex curved lobes uniformly spaced around their circumferences and are separated by concave cavities, are arranged side-by-side in a casing having inlet and outlet openings arranged respectively above and below the intermeshing zone of the rotors, the intermeshing rotors being shaped so that, in all angular positions, they have an interference fit one with the other and the interior of the casing being shaped to fit with a close working clearance round the outsides of the rotors (i.e. the sides remote from the intermeshnig zone). In this improved device, the rotors are arranged to rotate, in use, in directions such that particulate material entering the casing through the inlet opening will be deposited in the cavities between the lobes and carried round in these cavities between the rotors and the respective side walls of the casing before being discharged through the outlet opening.

The rotors, which are advantageously covered with the material known as Neoprene, may each have three uniformly spaced lobes having convex crown portions of smaller radius than the cavities between them. The crowns of the lobes may be hemi-cylindrical and the cavities between them part cylindrical.

The rotors are preferably of substantial length, e.g. their length may be two or three times as great as their pitch circle diameter, in which case the inlet and outlet openings should be rectangular section openings of the same lengths as the rotors and arranged with their longer sides parallel to the axes of rotation of the rotors.

The device may be arranged to receive fruit, such as currants or sultanas, at its inlet opening and to discharge this fruit through its outlet opening into a sump fixed beneath its outlet opening and containing a helical screw conveyor by which cake batter from a continuous mixer is conveyed at a pressure along the sump in a direction parallel to the axes of the rotors from an inlet at one end of the sump to an outlet at the other end thereof. A connection for the supply of compressed air preferably opens into the sump close alongside the inlet at its said one end. With this arrangement, the fruit delivered by the device is progressively introduced into and admixed with the batter during the passage of the batter from the one end of the sump to the other.

In a typical embodiment of the device, each rotor has three lobes and three depressions. The crowns of the lobes are hemi-cylindrical with a radius of curvature of 37 mm. and the depressions, which are part cylindrical over an angle of rather less than 90°, have a radius of curvature of 37 mm. The radial distances from the centre of each rotor to the bases of the depressions is 35 mm., while that to the tops of the crowns of the lobes is 75 mm. The rotors have a length of approximately 420 mm. The inlet and outlet openings of the casing of the device have a length of 415 mm. and a width of 126 mm.

The lobes in most cases will extend parallel to the rotor axes, but they may if desired be given a uniform helical twist.

Whereas the total loss of pressure from the zone of higher pressure to that of lower pressure with known paddle type air-locks is in the region of 30%, that in the case of the device described above is negligible and amounts to little more than the leakage due to machine clearances between the rotors and the casing.

For feeding the fruit to the inlet opening of the device in such a way as to flood this inlet an inclined rotary cylinder is mounted above the inlet opening, the central axis of the cylinder being preferably inclined at 45° to the vertical and the cylinder being rotated about this axis at a speed of about 35 r.p.m. The lower end of the cylinder is covered by a stationary plate which has in its lower portion an opening through which fruit can fall from the cylinder into the inlet opening of the pressure-lock. The size of this opening in the plate can be adjusted by means of a gate. The interposition of the inclined rotary cylinder between a storage hopper and the pressure-lock enables the fruit to be fed to the pressure-lock in a continuous stream and at a rate which can be varied by adjustment of the gate.

A second embodiment of the invention is shown in the accompanying drawings, in which:

FIG. 1 is a side view, partly in section, of a fruit mixing apparatus, and

FIG. 2 is a section of a detail of FIG. 1.

The apparatus shown in the drawings includes an inclined rotary cylindrical container 10 from which fruit is fed through a metering device 11 to a mixing device 12. Cake batter is fed under pressure into the mixing device 12 through an inlet 13 and the mixture of fruit and batter leaves the lower end of the mixing device through an outlet 14.

The container 10 is an open-ended cylinder and is supported by a diametrically extending arm 15 connected at its ends to the walls of the cylinder and mounted near its centre on the end of a driving shaft 16, to which it is secured by a nut 17. The cylinder is supported with its principal axis eccentric to the axis of the shaft 16 so that upon rotation of the shaft 16 the cylinder 10 is rotated with an eccentric motion which agitates the fruit more effectively than a simple rotary tumbling action. An extreme position taken up by the cylinder 10 during its rotation is indicated in broken lines at 10′.

The shaft 16 is carried in a fixed bearing 18 and driven through a universal joint 19 and a gear unit 20 by a motor 21. The shaft 16, and therefore the axis of the cylinder 10 is inclined at about 45°. At the upper end of the cylinder 10 is a fixed entry chute 22 which facilitates delivery of fruit into the container 10.

The lower end of the container 10 is covered by a fixed plate 23. The lower rim of the cylinder has attached to its outer side a flexible sealing member 24 which rubs against the surface of the plate 23. An annular flange 25 coaxial with the shaft 16 extends from the plate 23 and surrounds the area of the plate over which the cylinder 10 is carried during its eccentric motion. The part of the plate 23 adjacent the lower part of the end of the cylinder 10 has an opening 26. A shutter 27 enables the size of this opening to be varied.

The outlet opening 26 is angularly displaced from the lowest point of the cylinder. It is elliptical so that its projection onto the input area of the metering device is a circle, the major axis of the ellipse being parallel to the line of greatest slope of the plate 23. The eccentric motion of the cylinder carries it to the edge of the opening at the inner extreme of its movement.

From the opening 26 the fruit, which as a result of its agitation by the eccentric motion of the cylinder 10 is kept loose and prevented from compaction under its own weight, passes in a continuous stream into the metering device 11. The metering device, whose structure is shown in the section of FIG. 2, is a known type of gear pump which is the subject of British Patent No. 653,185. Briefly this gear pump, which is more fully described in the specification of Patent No. 653,185, consists of a rotary worm gear element 30 which has a helical vane 31 which is of varying inclination to the axis of the gear element such that it can mesh with radial slots 32 in a disc 33. The body of the worm gear element 30 is of concave profile to complement the convex periphery of the disc 33 and the casing of the device is shaped to fit closely around the element 30 and the disc 33 so that there can be little or no leakage through the device. The disc 33 is freely rotatable to allow rotation of the worm gear element 30 by a shaft 34 on which it is mounted. By such rotation fruit can be transmitted through the device at a controlled rate dependent upon the speed of the shaft 34. The fruit is carried through the device in discrete quantities lying between the turns of the vane 31 and separated by the parts of the disc 33 lying between the slots 32.

The fruit passes through the metering device 11 into the upper end of an inclined mixing chamber 35 of the mixing device 12. The shaft 34 passes through the lower wall of the upper end of the mixing chamber 35, where it is surrounded by a seal 36. The shaft 34 is supported by a bearing 37 and is driven through a belt drive 38 and gear unit 39 by a motor 40 (FIG. 1).

The inlet 13 of the mixing device 12 feeds aerated cake batter under pressure into the mixing chamber 35 immediately below the point at which the fruit drops from the worm gear element 30 into the mixing chamber. The main body of the mixing chamber 35 is generally cylindrical and contains a shaft 41 carrying pegs 42. Rotation of the pegged shaft by a motor 43 through gearing 44 (FIG. 1) effects thorough mixing of the fruit with the batter before the mixture leaves mixing chamber 35 through the outlet 14 of the mixing device.

The apparatus described has a cylindrical container of diameter 16½ inches which is mounted with an eccentricity of ⅜ inch so that the movement of each point of the rim is ¾ inch for a radius of 8¼ inch. The preferred speed of rotation to prevent compaction of the fruit without damaging the fruit is 15 r.p.m. but speeds of 10 to 50 r.p.m. can be used.

While the inclination of the cylinder to the horizontal has been chosen as 45°, it can be anything from 30° to 70° and possibly higher, the preferred inclination being between 40° and 55°.

The apparatus described may obviously be used for mixing other materials, for example, for mixing fruit into ice cream and sugar confectionery and for mixing crumb rubber into a stream of foam latex. If necessary the rate of rotation of the cylinder can be adjusted and the structure of the mixer can be changed to adapt the apparatus to different materials.

As alternatives to eccentric mounting of the rotary cylinder it may be rotated about its own axis at a constantly varying speed or may have an internal rib or other projection to break up the smooth flow of material around its internal surface.

While the apparatus described enables the volume of fruit supplied to the mixing chamber to be controlled by means of the metering device it may in some cases be necessary to determine the rate of supply of the fruit by weight. This may be done by mounting the apparatus on a number of load cells and measuring the decrease of weight as the quantity of fruit in the rotary cylinder decreases and the fruit is carried out of the apparatus in the batter. This change of weight can be integrated over a period of time to give the rate of flow of fruit. The speed of the metering device may be controlled manually or automatically to give the required rate of flow.

I claim:

1. Apparatus for treating an agglomerate mass of particulate material preparatory to transport or mixing comprising: a generally cylindrical container mounted with its axis inclined at an angle of between about 30° and about 70° to the horizontal, said container having open ends and a smooth internal surface; a stationary wall covering the open lower end of the said container, said wall having an outlet opening adjacent the lower part of the end of the container; and drive means for rotating said container to agitate material delivered into the upper end of said container.

2. Apparatus as claimed in claim 1 in which said drive means comprise means to rotate said container about an axis eccentric to the axis of said container.

3. Apparatus as claimed in claim 1 in which the axis of said container is inclined at an angle between about 40° and about 55° to the horizontal.

4. Apparatus for storing and dispensing cake fruit comprising: a generally cylindrical container mounted with its axis inclined to the horizontal at an angle between about 30° and about 70°, said container having open upper and lower ends and a smooth internal surface; a fixed wall positioned adjacent the lower end of said container to close said lower end and having an outlet opening adjacent the lower part of said end of said container; and drive means coupled to said container to rotate it about an axis parallel but eccentric to the axis of said cylinder; whereby the fruit is prevented from compacting and maintained in a condition to flow through the outlet opening without damage to the fruit.

5. Apparatus as claimed in claim 4 in which the axis of said container is inclined at an angle between 40° and 55° to the horizontal.

6. Apparatus as claimed in claim 5 including a metering device arranged below the outlet opening to control the rate of supply of the fruit.

7. Apparatus as claimed in claim 6 including an airtight enclosure, communicating with one into which the fruit is metered by said metering device, said metering device comprising: a casing; a first rotary gear element within said casing; a second rotary element within the casing in mesh with said first rotary gear element, said casing fitting closely about said rotary elements whereby leakage from the enclosure is prevented, said rotary elements co-operating to transmit the fruit in a continuous succession of discrete quantities carried in spaces between the working projections of said gear element.

8. In fruit-handling apparatus the combination of: a storage and dispensing container in which the fruit is agitated to prevent compaction under its own weight, said container being an open-ended drum with smooth internal walls, mounted with its axis inclined to the horizontal; drive means for rotating said drum; a fixed plate positioned across the lower end of said drum to close said lower end against escape of fruit and having an outlet opening below the axis of rotation of said drum; and a metering device mounted below said outlet opening to control the flow of fruit from said drum upon rotation of said drum.

9. Apparatus for mixing fruit into a cake batter comprising: a cylindrical container mounted with its axis inclined to the horizontal and having an open lower end; a stationary wall covering the said lower end and having an outlet opening therein; drive means for rotating said container about an inclined axis to prevent compaction of the fruit; a mixing chamber; a metering device mounted and providing communication between said outlet opening and said mixing chamber to admit fruit at a controlled rate to said mixing chamber, said metering device being adapted to prevent the escape of batter under pressure from said mixing chamber, a rotary mixing element within said mixing chamber for mixing the batter and fruit, said chamber having an outlet for the mixture.

10. Apparatus as claimed in claim 9 in which said container is mounted for rotation by the drive means about an axis eccentric to the axis of the container and inclined at an angle between 30° and 70° to the horizontal.

11. Apparatus as claimed in claim 10 in which said drive means comprise: a motor; and transmission means coupling said motor to said container to rotate it at between 10 and 50 revolutions per minute.

12. Apparatus as claimed in claim 11 in which the outlet opening is angularly displaced from the lowest part of the lower end of said container.

13. Apparatus as claimed in claim 12 in which said metering device comprises: a rotary gear element in the form of a worm having a helical vane of varying inclination relative to the axis of said worm; and a radially-slotted disc in which the vane of the worm meshes.

14. Apparatus as claimed in claim 13 in which said mixing element is a pegged shaft and said mixing chamber has a cylindrical portion coaxial with said shaft and inclined downwardly towards the outlet.

15. Apparatus as claimed in claim 9 in which the axis of said container is inclined at between 40° and 55° to the horizontal.

16. Apparatus as claimed in claim 15 including a driving shaft coupled to said drive means, said container being eccentrically mounted on said drive shaft.

17. Apparatus as claimed in claim 9 in which said metering device is a gear pump.

18. Apparatus as claimed in claim 9 in which said metering device comprises: a radially slotted disc; and a worm having a helical vane of varying inclination relative to the axis of the worm which meshes with said disc.

19. Apparatus as claimed in claim 9 in which said mixing chamber has a cylindrical portion co-axial with said rotary mixing element and inclined downwardly towards the outlet.

20. Apparatus for mixing fruit into a cake batter comprising: an open-ended cylindrical container for fruit; a drive shaft for said container inclined at an angle of between about 40° and about 55° to the horizontal, said container being eccentrically mounted on said drive shaft; drive means for rotating said drive shaft at between 10 and 50 r.p.m.; a fixed plate covering the lower end of said container and having an outlet opening in the said plate below said drive shaft; a metering device mounted under said outlet opening to receive fruit from said container, said metering device including a radially-slotted disc, a worm having a helical vane meshing with said disc, and a casing fitting closely about said disc and worm; and a mixing chamber arranged to receive the fruit from said metering device and having an outlet for batter adjacent said metering device; a rotary shaft having projections thereon for mixing the fruit and batter; a cylindrical housing portion surrounding said shaft, said housing portion and said shaft being inclined downwardly from the batter inlet; and outlet means for mixed fruit and batter.

References Cited by the Examiner

UNITED STATES PATENTS

| | | | |
|---|---|---|---|
| 891,823 | 6/1908 | Dickinson | 259—7 |
| 1,655,753 | 1/1928 | Cole | 222—167 X |
| 2,071,434 | 2/1937 | Sarnmark | 107—54 X |
| 2,123,223 | 7/1938 | Ayars | 222—221 |
| 2,200,930 | 5/1940 | McQueer | 259—10 X |
| 3,090,604 | 5/1963 | Wheeler | 259—175 X |

LOUIS J. DEMBO, *Primary Examiner.*

RAPHAEL M. LUPO, *Examiner.*

N. L. STACK, *Assistant Examiner.*